(12) United States Patent
Kotani et al.

(10) Patent No.: US 9,003,833 B2
(45) Date of Patent: Apr. 14, 2015

(54) POROUS GLASS, METHOD OF MANUFACTURING THE SAME AND OPTICAL ELEMENT

(75) Inventors: Yoshinori Kotani, Yokohama (JP); Zuyi Zhang, Yokohama (JP); Akira Sugiyama, Yokohama (JP); Kenji Takashima, Tokyo (JP); Naoyuki Koketsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/883,039

(22) PCT Filed: Nov. 25, 2011

(86) PCT No.: PCT/JP2011/077873
§ 371 (c)(1),
(2), (4) Date: May 2, 2013

(87) PCT Pub. No.: WO2012/074078
PCT Pub. Date: Jun. 7, 2012

(65) Prior Publication Data
US 2013/0224494 A1    Aug. 29, 2013

(30) Foreign Application Priority Data

Nov. 30, 2010 (JP) ................ 2010-266326
Nov. 18, 2011 (JP) ................ 2011-253072

(51) Int. Cl.
C03C 11/00  (2006.01)
C03C 15/00  (2006.01)
C03C 17/25  (2006.01)

(52) U.S. Cl.
CPC ............. C03C 11/005 (2013.01); C03C 15/00 (2013.01); C03C 17/25 (2013.01); C03C 2217/228 (2013.01); C03C 2217/23 (2013.01)

(58) Field of Classification Search
None
See application file for complete search history.

(56) References Cited

U.S. PATENT DOCUMENTS

| 4,683,168 A | 7/1987 | Hares et al. |
| 2013/0045853 A1 | 2/2013 | Kotani et al. |
| 2013/0067957 A1 | 3/2013 | Zhang et al. |

(Continued)

FOREIGN PATENT DOCUMENTS

| GB | 2 065 097 A | 6/1981 |
| JP | 49-036805 B | 10/1974 |

(Continued)

OTHER PUBLICATIONS

JP2002160941A Machine Translation Performed JPO website Jan. 9, 2015.*

(Continued)

*Primary Examiner* — Joseph S Del Sole
*Assistant Examiner* — Lisa Herring
(74) *Attorney, Agent, or Firm* — Fitzpatrick, Cella, Harper & Scinto

(57) ABSTRACT

This invention provides a porous glass with a varied porous structure that shows an excellent optical performance. A method of manufacturing a porous glass comprising: a first step of forming a surface layer containing a boron compound and an alkali metal compound as main ingredients on a matrix glass containing a silicon oxide, a boron oxide and an alkali metal oxide; a second step of heat treatment the matrix glass and the surface layer for phase separation to form a phase-separated glass; and a third step of acid treatment the phase-separated glass to form the porous glass having pores.

9 Claims, 5 Drawing Sheets

(56) References Cited

U.S. PATENT DOCUMENTS

2013/0068725 A1  3/2013  Takashima et al.
2013/0074548 A1  3/2013  Takashima et al.
2013/0233018 A1  9/2013  Takashima et al.

FOREIGN PATENT DOCUMENTS

| | | |
|---|---|---|
| JP | 61-205638 A | 9/1986 |
| JP | 1-317135 A | 12/1989 |
| JP | 9-208265 A | 8/1997 |
| JP | 2002160941 A * | 6/2002 |
| WO | 97/27150 A1 | 7/1997 |

OTHER PUBLICATIONS

Alexander Flügel et al., "Graded Pore Size by Ion Exchange of Phase-Separated 6.5 $Na_2O$·33.5 $B_23$·60 $SiO_2$ Glass" 73(7) Glastech. Ber. Glass Sci. Technol. 204-210 (2000) (XP-000954249).

Alexander Flügel et al., "Graded Pore Size by Ion Exchange of Phase-Separated 6.5 $Na_2O$-33.5 $B_23$-60 $SiO_2$ Glass" 73(7) Glastech. Ber. Glass Sci. Technol. 204-210 (2000) (XP-000954249).

\* cited by examiner

POROUS GLASS, METHOD OF MANUFACTURING THE SAME AND OPTICAL ELEMENT

TECHNICAL FIELD

The present invention relates to a porous glass, a method of manufacturing a porous glass and an optical element formed by using a porous glass.

BACKGROUND ART

Porous glass that is manufactured by utilizing the phenomenon of phase separation of glass is expected to find industrial applications as an optical material having a variety of optical features such as anti-reflection.

Porous glass that utilizes the phenomenon of phase separation of glass can be obtained generally by heat treatment borosilicate-based matrix glass that is found in a phase-separable composition range at 500° C. to 700° C. in order to cause the matrix glass to give rise to phase separation and subsequently turning porous by acid etching.

To obtain a porous glass material having excellent optical features such as anti-reflection, the formation of a porous glass structure importantly needs to be broadly controlled. The above-described known process provides a low degree of freedom of forming a porous structure and the obtained porous glass normally includes a single pore size so that the obtained optical performance is limited.

Techniques have been disclosed to provide glass with intended functional features by executing a specific process on glass in order to prepare porous glass having a variety of functional features.

PTL 1 discloses a porous glass coated with an organic polymer. PTL 2 discloses a method of manufacturing a composite material by applying a liquid dispersion of a nonviscous heat-resistant resin composition onto a specifically corroded glass surface and then curing the resin. PTL 3 discloses a substrate for preparing a plated circuit by applying a phase-separating ingredient onto a glass substrate containing $SiO_2$, heat-treating the glass substrate with the phase-separating ingredient for phase separation and subsequently removing only the phase containing $SiO_2$ to a small extent.

According to PTLs 1 and 2, a resin substance is applied onto glass having a porous structure in order to provide the glass with an environmental stability feature such as an anti-fouling property. PTL 3 describes the use of PYREX (registered trademark) and quartz glass that can hardly be turned porous for a glass substrate roughening $SiO_2$ in Example. The PTL 3 teaches a method of roughening a glass surface for the purpose of improving the adhesion between glass of a substrate and a metal plating film to be formed thereon.

While techniques of providing a glass substrate with an environmental stability feature such as an antifouling property and a surface roughening feature by coating for the glass surface have been disclosed as above, no technique of broadly controlling the formation of a porous glass structure by means of phase separation are known to date.

CITATION LIST

Patent Literature

PTL 1: Japanese Patent Application Laid-Open No. H09-208265

PTL 2: Japanese Patent Application Laid-Open No. S61-205638

PTL 3: Japanese Patent Application Laid-Open No. H01-317135

SUMMARY OF INVENTION

Technical Problem

As pointed out above, there is a demand for porous glass produced by broadly controlling the formation of the glass structure, but no method of manufacturing porous glass with a high degree of freedom of structure formation by means of phase separation is known to date.

The present invention is made in view of the above-identified problem. Therefore, an object of the present invention is to provide a porous glass with a varied porous structure that shows an excellent optical performance and an optical element formed by using a porous glass.

Another object of the present invention is to provide a method of manufacturing a porous glass that can broadly control the formation of a porous structure.

Solution to Problem

According to one aspect of the present invention, there is provided a method of manufacturing a porous glass comprising: a first step of forming a surface layer containing a boron compound and an alkali metal compound as main ingredients on a matrix glass containing a silicon oxide, a boron oxide and an alkali metal oxide; a second step of heat treatment the matrix glass and the surface layer for phase separation to form a phase-separated glass; and a third step of acid treatment the phase-separated glass to form the porous glass having pores.

According to another aspect of the present invention, there is provided a method of manufacturing an imaging apparatus comprising an imaging element and an optical element containing a porous glass, wherein the porous glass is manufactured by the above method of manufacturing a porous glass.

According to further aspect of the present invention, there is provided a porous glass wherein an average skeletal diameter increases from a surface toward an inside.

Further, according to one aspect of the present invention, there is provided an imaging apparatus comprising an imaging element and an optical element containing the above porous glass.

Advantageous Effects of Invention

Thus, the present invention can provide a porous glass with a varied porous structure that shows an excellent optical performance and an optical element formed by using a porous glass.

The present invention can also provide a method of manufacturing a porous glass that can broadly control the formation of a porous structure.

Further features of the present invention will become apparent from the following description of exemplary embodiments with reference to the attached drawing.

DESCRIPTION OF EMBODIMENTS

Now, the present invention will be described in detail by way of an embodiment thereof.

Figure 1:
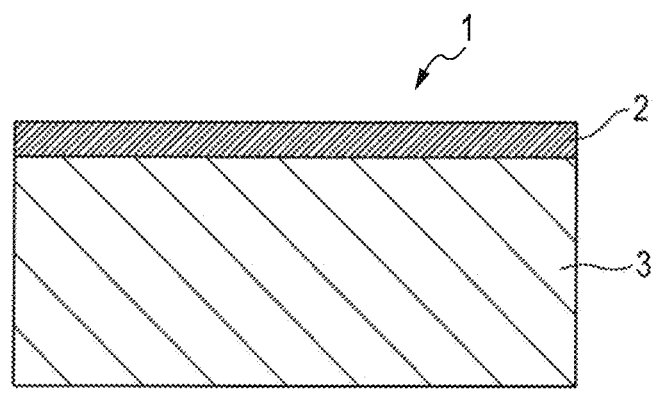
FIG. 1 is a schematic view illustrating an embodiment of porous glass according to the present invention.

FIG. 1 is a schematic view illustrating an embodiment of porous glass according to the present invention.

Referring to FIG. 1, porous glass 1 according to the present invention includes a glass inside 3 containing silicon oxide as main ingredient and a glass surface layer section 2 also containing silicon oxide as main ingredient on the glass inside 3. The glass surface layer section 2 and the glass inside 3 possess continuous pores. In the porous glass, the average skeletal diameter $R_1$ of the glass surface layer section 2 is smaller than the average skeletal diameter $R_2$ of the glass inside 3.

Figure 2A:
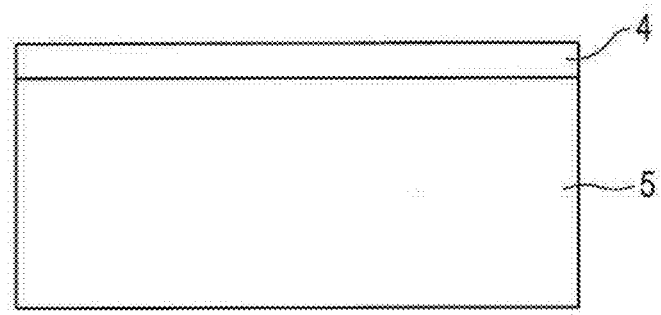
FIG. 2A is a process drawing illustrating a method of manufacturing porous glass according to the present invention.
Figure 2B:
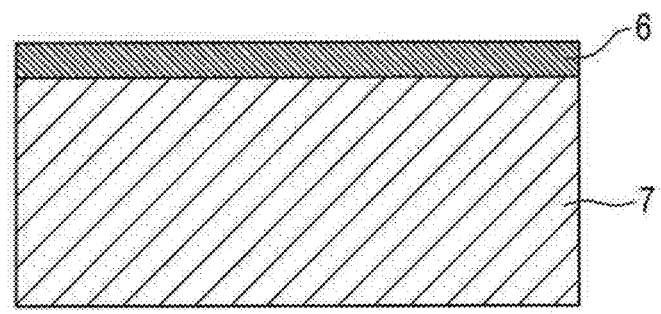
FIG. 2B is a process drawing illustrating the method of manufacturing porous glass according to the present invention.
Figure 2C:
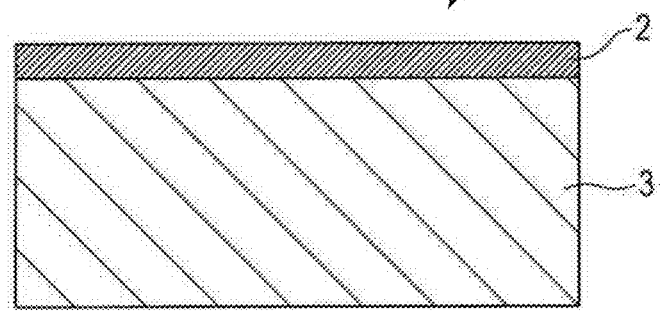
FIG. 2C is a process drawing illustrating the method of manufacturing porous glass according to the present invention.

FIGS. 2A to 2C are a process drawing illustrating the method of manufacturing porous glass according to the present invention. Referring to FIGS. 2A to 2C, the method of manufacturing porous glass according to the present invention includes the first to third step as will be described below.

The first step is a step of forming a surface layer 4 that contains a boron compound and an alkali metal compound as main ingredients on a matrix glass 5 that contains a silicon oxide, a boron oxide and an alkali metal oxide (see FIG. 2A).

The second step is a step of heat treatment the matrix glass 5 and the surface layer 4 for phase-separating the matrix glass 5 and the surface layer 4 to form a phase-separated glass (see FIG. 2B). "Phase separation" will be described by way of an instance where a borosilicate glass that contains silicon oxide, boron oxide and oxide having alkali metal is employed as glass body. "Phase separation" refers to separation of a phase containing the oxide having the alkali metal and the boron oxide more than the composition before the phase separation (non-silica rich phase) and a phase containing the oxide having the alkali metal and the boron oxide less than the composition before the phase separation (silica-rich phase) with structures of a scale of several nanometers.

The third step is a step of acid treatment the phase-separated glass (the glass inside 7 and the glass surface layer section 6 that are phase-separated) to form continuous pores in the phase-separated glass in order to obtain the porous glass (see FIG. 2C).

By producing a composition gradient in the glass structure due to providing a glass composition shift induced layer such as a glass surface layer section 2, a porous glass according to the present invention provides a higher degree of freedom of forming a porous structure and allows a broader range of controlling the formation of such a structure. Thus, the present invention provides a method of manufacturing a porous glass showing an excellent optical performance and an optical element employing such a porous glass.

According to the present invention, a matrix glass 5 that is the matrix of a porous glass contains silicon oxide, boron oxide and alkali metal oxide.

Examples of materials that can be used for the matrix glass 5 that constitutes the inside of a porous glass according to the present invention include, for example, silicon oxide-based porous glass I (matrix glass composition: silicon oxide-boron oxide-alkali metal oxide), silicon oxide-based porous glass II (matrix glass composition: silicon oxide-boron oxide-alkali metal oxide—(at least alkaline earth metal oxide, zinc oxide, aluminum oxide and zirconium oxide), silicon oxide-based porous glass III (matrix glass composition: silicon oxide-phosphate-alkali metal oxide) and titanium oxide-based porous glass (matrix glass composition: silicon oxide-boron oxide-calcium oxide-magnesium oxide-aluminum oxide-titanium oxide). Particularly, the borosilicate-based glass of silicon oxide-boron oxide-alkali metal oxide is preferably used as matrix glass. More particularly, the use of borosilicate-based glass having a composition with a content ratio of silicon oxide not less than 55 wt % and not more than 85 wt % is preferable and the use of borosilicate-based glass having a composition with a content ratio of silicon oxide not less than 60 w % and not more than 80 wt % is more preferable. Such matrix glass has a phase separation property. The "phase separation property" is such that, when borosilicate-based glass of silicon oxide-boron oxide-alkali metal oxide is employed as matrix glass, phase separation into a silicon oxide-rich phase and an alkali metal oxide-boron oxide-rich phase takes place in the inside of the glass by heat treatment.

As for the method of manufacturing matrix glass, any known method can be used to manufacture matrix glass so long as a material having the above-described composition is prepared. For example, matrix glass can be manufactured by heating and melting a material containing sources of the each ingredient and, if necessary, molding the molten glass to a desired shape. The heating temperature for heating and melting the material may be appropriately selected according to the composition of the material, normally the heating temperature range is not lower than 1,350° C. and not higher than 1,450° C., preferably not lower than 1,380° C. and not higher than 1,430° C.

For example, sodium carbonate, boric acid and silicon dioxide may well be mixed uniformly as source material, and then heated and melted at temperature not lower than 1,350° C. and not higher than 1,450° C. In such a situation, any source material may be employed so long as it contains ingredients of alkali metal oxide, boron oxide and silicon oxide as described above.

When porous glass is to be molded to a predetermined shape, after synthesizing matrix glass having a phase separation property, the matrix glass may well be molded to the predetermined shape, which may be tubular, tabular or spherical generally at temperature not lower than 1,000° C. and not higher than 1,200° C. For example, a technique of synthesizing matrix glass having a phase separation property by melting the material as described above, synthesizing the matrix glass having the phase separation property and subsequently lowering the temperature from the melting point and maintaining the temperature to a level not lower than 1,000° C. and not higher than 1,200° C. for molding may suitably be adopted.

Now, the method of manufacturing a porous glass according to the present invention will be described below on a step by step basis.

(First Step)

In the first step of the method of manufacturing a porous glass according to the present invention, a surface layer 4 containing a boron compound and an alkali metal compound as main ingredients is formed on a matrix glass 5 containing a silicon oxide, a boron oxide and an alkali metal oxide (see FIG. 2A).

The surface layer 4 that contains boron compound and alkali metal compound as main ingredients can be formed by means of a known technique selected from vapor phase techniques such as CVD and PVD and sol-gel liquid phase techniques, of which a coating method using the sol-gel liquid phase technique may preferably be employed because a surface layer can easily be formed on a matrix glass having a phase separation property and a shape that may be any of various shapes including tabular shapes and curved shapes depending on the application thereof.

The surface layer containing the boron compound and the alkali metal compound as main ingredients is oxidized by the heat treatment in the next step to become a layer containing boron oxide and alkali metal oxide as main ingredients. The source materials containing the boron compound and the alkali metal compound as main ingredients include organic boron compounds, borates, organic alkali metal compounds and alkali metal salts of organic acids that can produce boron oxide compounds and alkali metal oxides by oxidation due to the heating. For example, such source materials include boron, various metal alkoxides of alkali metals and compounds such as acetates, chlorides and nitrates. Beside the main ingredients, an organic silicon compound that produces silicon oxide as a result of oxidation when heated may be added as ingredient.

Specific examples of boron compounds include trimethyl borate, triethyl borate, tributyl borate and boric acid. Specific examples of alkali metal compounds include sodium acetate, acetylacetone sodium and sodium stearate. Specific examples of organic silicon compounds include tetramethoxysilane, tetraethoxysilane and silicate oligomer such as methyl silicate 53A (available from Colcoat Co., Ltd.).

The boron compound, the alkali metal compound, and the organic silicon compound which is to be added if necessary, are dissolved in an organic solvent to prepare a solution of the boron compound and the alkali metal compound.

Examples of organic solvents that can be used for the purpose of the present invention include alcohols such as methanol, ethanol, 2-propanol, butanol and ethylene glycol, various aliphatic and cycloaliphatic hydrocarbons such as n-hexane, n-octane and cyclohexane, various aromatic hydrocarbons such as toluene and xylene, various esters such as ethyl formate, ethyl acetate and n-butyl acetate, various ketones such as acetone, methyl ethyl ketone and methyl isobutyl ketone, various ethers such as tetrahydrofuran and dioxane and aprotic polar solvents such as N-methylpyrrolidone, dimethylformamide and dimethylacetamide. When preparing a coating solution to be used for the purpose of the present invention, the use of the alcohols selected from the above listed various solvents is preferable from the viewpoint of stability of solution. When a metal alkoxide source material that is highly reactive to water is employed, the obtained solution can often give rise to white turbidity and precipitation as the solution is rapidly hydrolyzed by moisture in air and/or added water. A stabilizing agent may be added for the purpose of stabilizing the solvent and prevent such phenomena from taking place.

Examples of stabilizing agents include β-diketone compounds such as acetylacetone, β-ketoester compounds such as methyl acetoacetate and ethyl acetoacetate, and alkanolamines such as monoethanolamine, diethanolamine and triethanolamine. The ratio of the added stabilizing agent is preferably about 1 relative to the metal alkoxide in terms of mol ratio. The expression of the ratio of added A relative to B that is 1 in terms of mol ratio means for the purpose of the present invention that the molar amount of added A is equal to the molar amount of B. Generally, water is added to give rise to a hydrolytic reaction of metal alkoxide. Then, catalyst is appropriately employed in order to accelerate the reaction. Examples of the catalyst include nitric acid, hydrochloric acid, sulfuric acid, phosphoric acid, acetic acid and ammonia.

The solution is preferably so prepared as to make the total quantity by which the boron compound, the alkali metal compound, and the organic silicon compound which is added only if necessary, is added to be found within a range of not less than 1 wt % and not more than 30 wt % in terms of weight ratio relative to the weight of the oxide of the oxide layer that is obtained by heating.

When a thin film is formed by using a coating solution that does not contain any stabilizing agent, the atmosphere in which the coating operation is conducted is preferably a dry air atmosphere or an inert gas atmosphere such as dry nitrogen and the like. The relative humidity of the dry atmosphere is preferably not greater than 30%.

The surface layer that contains the boron compound and the alkali metal compound as main ingredients is preferably formed by coating a solution containing the boron compound and the alkali metal compound as main ingredients. Examples of solution coating techniques for forming a coat film for the purpose of the present invention include dipping, spin-coating, spraying and combinations of any of them. In other words, any known coating means may appropriately be adopted. The film thickness can be controlled by appropriately varying the pulling up speed when the dipping technique is employed, the substrate rotating speed when the spin coating technique is employed, and also varying the concentration of the coating solution.

The thickness of the surface layer 4 containing the boron compound and the alkali metal compound as main ingredients that is formed on the matrix glass 5 having the phase separation property for the purpose of the present invention is preferably not less than 10 nm and not more than 5 μm, more preferably not less than 30 nm and not more than 3 μm.

(Second Step)

According to the present invention, a second step is heat treatment the matrix glass 5 and the surface layer 4 to cause the diffusion of ingredients between the matrix glass 5 and the surface layer 4 for phase-separating the matrix glass 5 and the surface layer 4 to form a phase-separated glass (see FIG. 2B). The phase-separated glass formed in this step is phase-separated into a silicon oxide-rich phase and an alkali metal oxide-boron oxide-rich phase. The phase-separated glass includes a part extended from the surface to the inside of the phase-separated glass in which the ratio of the silicon oxide-rich phase relative to the alkali metal oxide-boron oxide-rich phase changes. More specifically, the ratio of the alkali metal oxide-boron oxide-rich phase decreases from the surface toward the inside of the phase-separated glass, whereas the ratio of the silicon oxide-rich phase increases from the surface toward the inside.

The matrix glass 5 is turned into the phase-separated glass inside 7 as a result of phase-separation that takes place in a heat treatment. The surface layer 4 that contains the boron compound and the alkali metal compound as main ingredients is oxidized and phase-separated by the heat treatment and then turned into a phase-separated glass surface layer section 6 in which the ratio of the alkali metal oxide-boron oxide-rich phase is higher than the glass inside 7. However, as pointed out above, because the phase-separated glass includes the part extended from the surface to the inside of the phase-separated glass in which the ratio of the silicon oxide-rich phase relative to the alkali metal oxide-boron oxide-rich phase changes, the boundary of the glass surface layer section 6 and the glass inside 7 is not easily recognizable. Note that the glass surface layer section 6 refers to a part in which the ratio of the silicon oxide-rich phase relative to the alkali metal oxide-boron oxide-rich phase changes and which appears in a region from the surface to a zone that is about 50 μm deep from the surface.

After forming the surface layer 4 (after the 1st Step), a preliminary heat treatment operation (calcining) may be conducted before the heat treatment step for phase separation. The purpose of this preliminary heat treatment is to accelerate the mutual diffusion of ingredients between the layer and the matrix glass having the phase separation property. The preliminary heat treatment operation is conducted at temperature lower than the heat treatment temperature for phase separation. More specifically, the preliminary heat treatment operation is conducted at temperature not lower than 100° C. and not higher than 500° C. and the preliminary heat treatment time is not shorter than 5 hours and not longer than 5 days (120 hours).

The heat treatment temperature for phase separation in the heat treatment step for phase separation can be appropriately set not lower than 400° C. and not higher than 800° C. and the heat treatment time for phase separation can be appropriately set normally in a range between not shorter than 20 hours and not longer than 100 hours as the conventional art.

Generally, a matrix glass having a phase separation property can be phase-separated by heat treatment the matrix glass having the phase separation property. The heat treatment temperature can be appropriately set not lower than 500° C. and not higher than 800° C. and the heat treatment time can be appropriately set in a range between not shorter than 20 hours and not longer than 100 hours according to the pore diameter of the obtained porous glass and the other factors.

(Third Step)

Then, according to the present invention, the third step is acid treatment the phase-separated glass (the glass inside 7 and the glass surface layer section 6) obtained in the step of FIG. 2B to form continuous pores in the glass surface layer section and the glass inside in order to obtain the porous glass (see FIG. 2C).

The alkali metal oxide-boron oxide-rich phase that is an acid-soluble component is eluted by bringing the phase-separated glass obtained in the above-described heat treatment step into contact with an acidic solution. Examples of acids that can be used for the acidic solution include inorganic acids such as hydrochloric acid and nitric acid. Normally, the acidic solution can suitably be used in the form of an aqueous solution prepared by using water as solvent. Normally, a concentration within a range not less than 0.1 mol/L and not more than 2 mol/L may be appropriately selected for the acidic solution. In this acid treatment step, the temperature of the solution may appropriately be held within a range of not lower than room temperature and not higher than 100° C. and the treatment time may well be not shorter than 1 hour and not longer than 50 hours.

Subsequently, a porous glass having skeletons of silicon oxide is obtained by way of a water washing process. The temperature of washing water in the water washing process may appropriately be held within a range of not lower than room temperature and not higher than 100° C. and the process time can appropriately be selected according to the composition and the size of the glass to be washed. However, the time of the water washing process may well be normally not shorter than 1 hour and not longer than 50 hours.

Phase separation is classified into spinodal type and binodal type. The pores of the porous glass obtained by spinodal type phase separation are through and continuous pores running from the surface to the inside thereof, while the pores of the porous glass obtained by binodal type phase separation are independent pores. The porous glass obtained by spinodal type phase separation has a structure in which pores are entangled three-dimensionally and which may look like "ant nest", where the skeletons of silicon oxide operate as "nest" and the continuous pores operate as "hole". On the other hand, the porous glass obtained by binodal type phase separation has a structure in which each independent pore is defined by a closed surface nearly spherical shape and exists discontinuously in the skeletons of silicon oxide. Those pores can be classified by a morphological observation through an electron microscope. Spinodal phase separation and binodal phase separation are described for example in John Wiley & Sons, "Introduction to Ceramics, second edition, "Chapter 8"", 1960.

The average pore diameter of a porous glass according to the present invention is preferably within a range of not less than 1 nm and not more than 1 μm, more preferably within a range of not less than 2 nm and not more than 0.5 μm, most preferably within a range of not less than 10 nm and not more than 100 nm, although the present invention by no means limited thereto. Normally, a porosity of a porous glass according to the present invention is preferably not less than 10% and not more than 90%, more preferably not less than 20% not more than 80%.

For the purpose of the present invention, the total content of the boron oxide and the alkali metal oxide is not less than 50 wt % and not more than 100 wt %, preferably not less than 60 wt % and not more than 95 wt % in terms of oxide content, relative to the weight of the entire surface layer that contains the boron compound and the alkali metal compound as main ingredients on the matrix glass. When the total content of boron oxide and alkali metal oxide is small, the film can remain after the acid treatment step. The formed surface layer may contain a silicon compound. Then, the content of the silicon compound is preferably not less than 5 wt % and not more than 40 wt % relative to the weight of the entire surface layer.

The average skeletal diameter $R_1$ of the glass surface layer section of a porous glass according to the present invention is smaller than the average skeletal diameter $R_2$ of the glass inside. Furthermore, the difference X between the average skeletal diameter of the glass surface layer section and the average skeletal diameter of the glass inside ($X=R_2-R_1$) is preferably 25 nm≤X≤70 nm when the porous glass is used as an optical element.

Figure 5:
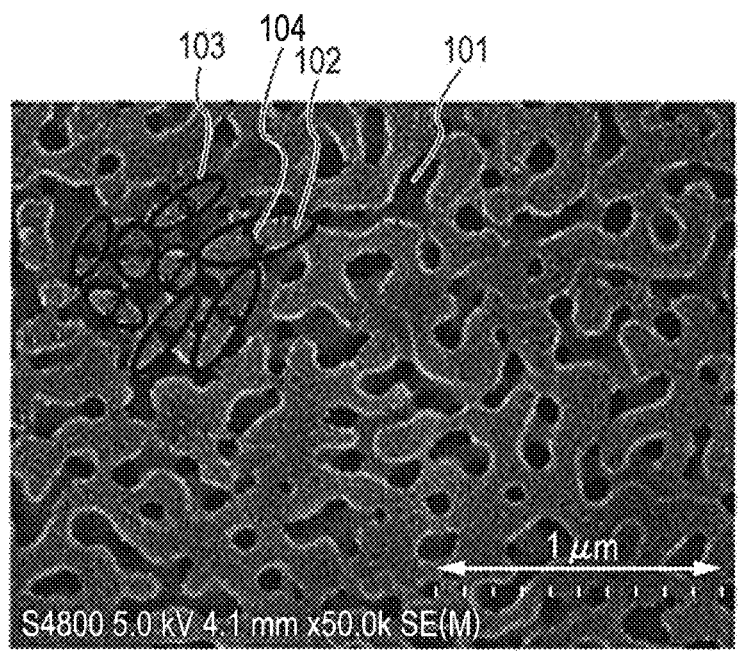
FIG. 5 is a view illustrating average skeletal diameter.

Preferably, the average skeletal diameter $R_1$ of the glass surface layer section is not less than 5 nm and not more than 75 nm and the average skeletal diameter $R_2$ of the glass inside is not less than 30 nm and not more than 100 nm. To determine the average skeletal diameter of porous glass, each skeleton is approximated by a plurality of ellipses in a predetermined range on the porous body surface and the minor axis of each of the approximate ellipses is observed through a scanning electron microscope. Then, this operation is repeated in not less than 30 predetermined ranges. Thereafter, the average skeletal diameter is determined by averaging the obtained values. More specifically, an image of the surface of a porous body as shown in FIG. 5 is obtained by electron microscope photography and skeleton 102 is approximated by a plurality of ellipses 103. Then, the average value of the minor axes 104 of the ellipses is determined. In FIG. 5, reference symbol "101" denotes a pore in the porous glass. The average skeletal diameters of the glass surface layer section and of the glass inside are determined, and then the range of difference value is determined by using those average diameters. Any other technique may alternatively be employed for the purpose of the present invention.

While the mechanism of forming a porous structure of a porous glass according to the present invention is still not clear in various aspects, a speculated theory will be described below. As a surface layer is formed on a matrix glass having the phase separation property and then a heat treatment including calcining is conducted for phase separation, diffusion of ingredients of the glass inside and the surface layer takes place mutually in the glass surface layer section to differentiate the glass composition of the glass surface layer section from that of the glass inside. The term of glass surface layer section as used herein refers to a part of the matrix glass having the phase separation property (glass surface layer section+glass inside) from the surface thereof down to a depth of 50 μm. Since diffusion of ingredients takes place continuously, the glass composition is conceivably graded. Since the glass surface layer section shows a composition different from the composition of the glass inside, the morphology of the phase separation and the degree of phase separation differ between the glass surface layer section and the glass inside and the obtained porous structure also varies between the glass surface layer section and the glass inside. Diffusion of ingredients takes place between the glass inside and the surface layer in the glass surface layer section to change the composition of the glass surface layer section so that the state of phase separation in the glass surface layer section differs from the state of spinodal phase separation observable in the glass inside. In the phase-separated glass surface layer section, the ratio of the alkali metal oxide-boron oxide-rich phase decreases from the surface toward the inside. Thus, in the porous glass structure that is ultimately obtained, the average skeletal diameter is smaller in the glass surface layer section than in the glass inside. Additionally, in the porous glass structure that is ultimately obtained, the porosity gradually decreases from the surface toward the inside. As a simple method of determining the porosity of a porous glass, a process of binarizing an image obtained by electron microscope photography can be utilized. In the image obtained by electron microscope photography, the skeletal part of the porous glass is mainly white and the porous part of the porous glass is mainly black. However, the skeletal part may show grayish areas while the porous part may show light areas where the under skeletal part is appeared to a slight extent. The image can be converged to white and black by binarization in order to completely separate the skeletal part and the porous part. Then, the ratio of the area of the black part relative to the total area (the sum of the area of the white part and that of the black part) is determined. Images took at magnifications of 50 thousands, 100 thousands and 150 thousands are employed. Then, the obtained average value serves as the porosity. The refractive index of the porous glass can be determined from the porosity. The refractive index of air is about 1 and the refractive index of silica for forming skeletons is about 1.46 relative to light with a wavelength of 550 nm. Then, the contribution of air and that of skeletons are determined by using the porosity, and the refractive index of the porous glass can be obtained by adding them.

A porous glass according to the present invention can be used as an optical element. Since the porous glass structure can be broadly controlled, a porous glass according to the present invention can be expected to find applications as optical elements including optical lenses for imaging, observation, projection, and scanning optical systems and deflector plates for display apparatus. When the porous glass is to be employed as an optical element and the glass surface layer section is to be disposed at the light incident place side relative to the glass inside, the present invention can provide a low reflectance optical element. A porous glass according to the present invention can be used as part of an optical element to be arranged in an imaging apparatus (e.g., a digital camera or a digital video camera) having an imaging element disposed in a cabinet. The present invention provides a method of manufacturing an imaging apparatus when a porous glass to be used as an optical element is manufactured by the above-described method.

As described above, the formation of the porous structure in which the glass surface layer section has a structure different from the glass inside can be realized by introducing a process of arranging a surface layer section on a known matrix glass having the phase separation property so that the process of forming the porous glass structure can be broadly controlled. Then, the freedom of a structure showing a graded refractive index is broadened for the porous glass to be obtained.

EXAMPLES

Now, the present invention will be described in greater detail by way of examples. Note, however, the present invention is by no means limited by the examples.

The porous glass of each of Examples and Comparative Examples is evaluated in a manner as described below.

(1) Surface Observation

A cross section of the porous glass was observed by the scanning electron microscope (FE-SEM S-4800, available from Hitachi, Ltd.).

(2) Reflectance Measurement

The reflectance of the porous glass was measured by means of a spectral reflectivity measurement instrument (USPM-RU, Olympus Optical Co., Ltd.).

Example 1

Sodium carbonate, boric acid, silicon dioxide and alumina were used as glass source materials, uniformly mixed to a composition ratio of $Na_2O:B_2O_3:SiO_2:Al_2O_3=4.5:19:75:1.5$ (wt %), and heated to melt at 1,350 to 1,450° C. Subsequently, the melt was molded to show a plate-like profile and cooled naturally to obtain a plate glass having a thickness of about 1 mm.

A coating solution prepared in advance was applied onto the matrix glass having the composition of $4.5Na_2O\text{-}19B_2O_3\text{-}75SiO_2\text{-}1.5Al_2O_3$ (wt %) obtained by cut the plate glass about 2 cm square to produce a coat film of a thickness of about 200 nm by spin coating.

How the coating solution was prepared in advance will be described below. Tri-n-butyl borate and sodium acetate were used respectively as source materials of boron oxide and sodium oxide, and ethanol was used as solvent. After dissolving tri-n-butyl borate into ethanol, dilute hydrochloric acid was added to the solution and the solution was stirred. Then, sodium acetate was dissolved into the solution to produce the coating solution. More specifically, the coating solution was prepared so as to make boron oxide and sodium oxide to show a weight ratio of 4:1 in terms of oxide content.

The matrix glass that was subjected to spin coating was calcined at 300° C. for 4 days and subsequently heat treated at 600° C. for 50 hours. Furthermore, the matrix glass was immersed in 1 mol/L aqueous solution of nitric acid heated at 80° C. for 24 hours and then in an ion exchange water at 80° C. for 24 hours to obtain the porous glass.

Figure 3A:
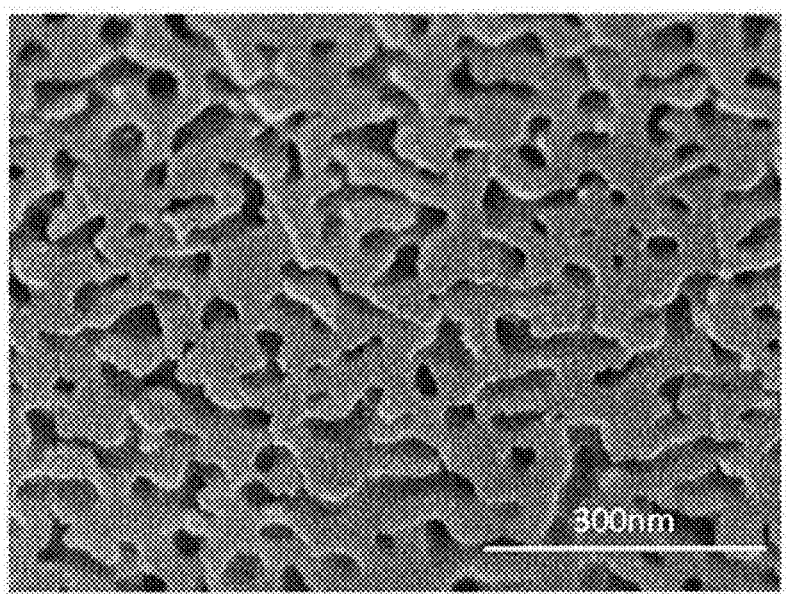
FIG. 3A is a cross sectional view of the porous glass obtained in Example 1 by observation through an electron microscope.
Figure 3B:
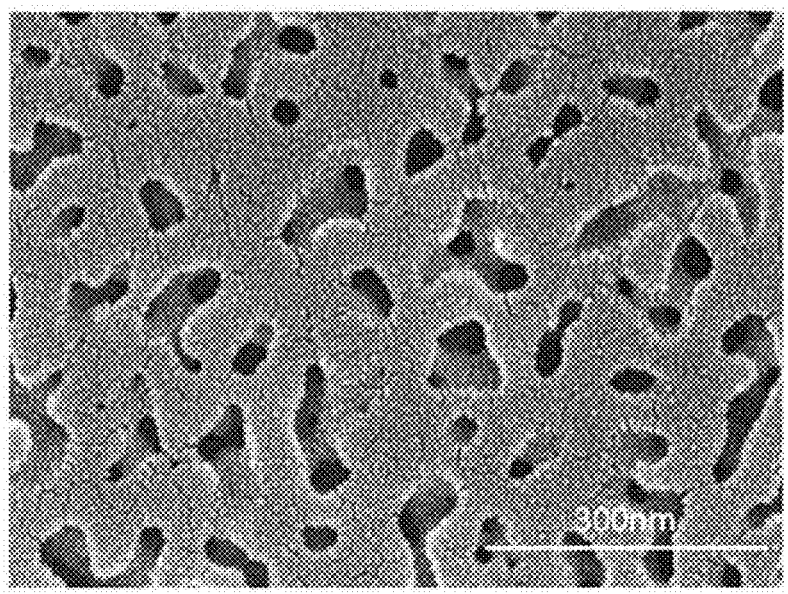
FIG. 3B is another cross sectional view of the porous glass obtained in Example 1 by observation through an electron microscope.

FIGS. 3A and 3B show the results obtained by the cross section SEM observations of the obtained porous glass. FIG. 3A shows the result of an observation of an area that is 5 μm deep from the surface, and FIG. 3B shows the result of an observation of an area that is 150 μm deep from the surface. From FIGS. 3A and 3B, the formation of the porous structure having continuous pores like "ant nest" was realized. The average skeletal diameter $R_1$ in FIG. 3A is 49 nm and the average skeletal diameter $R_2$ in FIG. 3B is 95 nm. The average skeletal diameter $R_1$ in FIG. 3A was smaller than the average skeletal diameter $R_2$ in FIG. 3B and the difference X was 46 nm. As described above, that the skeletal diameter differs between the glass surface layer section and the glass inside was proved. The porosity was 25%, 21%, 19% and 15% respectively at areas that were 5 μm, 30 μm, 100 μm and 150 μm deep from the surface.

Example 2

A coating solution prepared in advance was applied onto the matrix glass having the composition of 4.5$Na_2O$-19$B_2O_3$-75$SiO_2$-1.5$Al_2O_3$ (wt %) obtained by cut the plate glass about 2 cm square as in Example 1 to produce a coat film by spin coating. The coating solution was prepared as in Example 1 so as to make boron oxide and sodium oxide to show a weight ratio of 5:1 in terms of oxide content. The matrix glass that was subjected to spin coating was calcined at 300° C. for 4 days and subsequently heat treated at 600° C. for 50 hours. Furthermore, the matrix glass was immersed in 1 mol/L aqueous solution of nitric acid heated at 80° C. for 24 hours and then in an ion exchange water at 80° C. for 24 hours to obtain the porous glass.

As a result of cross section SEM observations of the obtained porous glass, the formation of the porous structure having continuous pores like "ant nest" was realized as in Example 1. The average skeletal diameter $R_1$ of the continuous pores in the glass surface layer section was 64 nm and the average skeletal diameter $R_2$ of the continuous pores in the glass inside was 93 nm. The average skeletal diameter of the glass surface layer section was smaller than the average skeletal diameter of the glass inside and the difference X of average skeletal diameter of continuous pores between the glass surface layer section and the glass inside was 29 nm. The porosity became smaller as the depth from the surface increased as in Example 1.

Example 3

A coating solution prepared in advance was applied onto the matrix glass having the composition of 4.5$Na_2O$-19$B_2O_3$-75$SiO_2$-1.5$Al_2O_3$ (wt %) obtained by cut the plate glass about 2 cm square as in Example 1 to produce a coat film by spin coating. The coating solution was prepared as in Example 1 except that a silicon oxide ingredient was added.

A silicate oligomer obtained by causing a hydrolysis-condensation/polymerization reaction to partially advance (methyl silicate 53A, available from Colcoat Co., Ltd.) was used as the silicon oxide ingredient. The coating solution was prepared so as to make boron oxide, sodium oxide and silicon oxide to show a weight ratio of 4:1:0.5 in terms of oxide content. The matrix glass that was subjected to spin coating was calcined at 300° C. for 4 days and subsequently heat treated at 600° C. for 50 hours. Furthermore, the matrix glass was immersed in 1 mol/L aqueous solution of nitric acid heated at 80° C. for 24 hours and then in an ion exchange water at 80° C. for 24 hours to obtain the porous glass.

As a result of cross section SEM observations of the obtained porous glass, the formation of the porous structure having continuous pores like "ant nest" was realized as in Example 1. The average skeletal diameter $R_1$ of the continuous pores in the glass surface layer section was 29 nm and the average skeletal diameter $R_2$ of the continuous pores in the glass inside was 96 nm. The average skeletal diameter of the glass surface layer section was smaller than the average skeletal diameter of the glass inside and the difference X of average skeletal diameter of continuous pores between the glass surface layer section and the glass inside was 67 nm. The porosity became smaller as the depth from the surface increased as in Example 1.

Example 4

The porous glass obtained in Example 1 was subjected to a reflectance measurement. The reflectance at 700 nm was 2.68% and the reflectance at 600 nm was 2.72%, while the reflectance at 500 nm was 2.88% and the reflectance at 400 nm was 2.83%.

Comparative Example 1

The matrix glass having the composition of 4.5$Na_2O$-19$B_2O_3$-75$SiO_2$-1.5$Al_2O_3$ (wt %) obtained by cut the plate glass about 2 cm square as in Example 1 was calcined at 300° C. for 4 days and subsequently heat treated at 600° C. for 50 hours. Furthermore, the matrix glass was immersed in 1 mol/L aqueous solution of nitric acid heated at 80° C. for 24 hours and then in an ion exchange water at 80° C. for 24 hours.

Figure 4A:
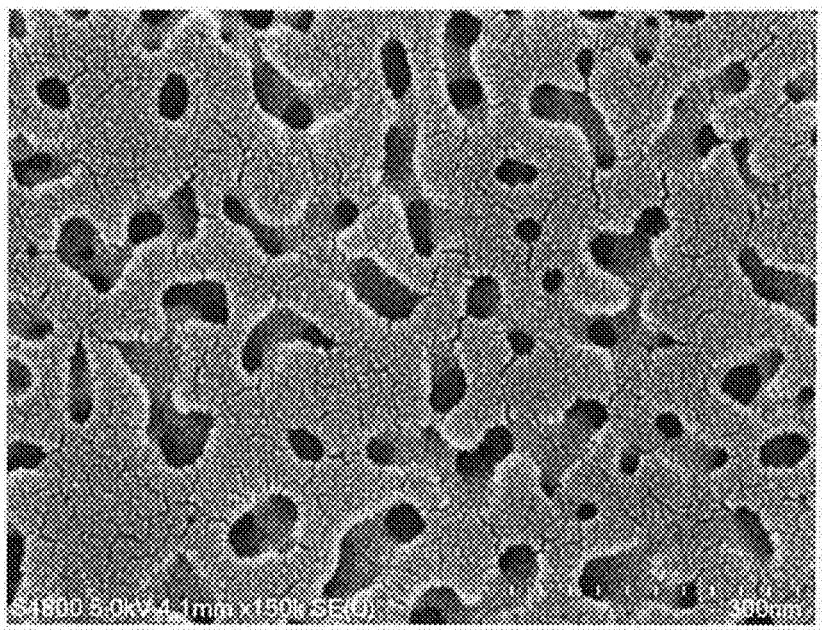
FIG. 4A is a cross sectional view of the porous glass obtained in Comparative Example 1 by observation through an electron microscope.
Figure 4B:
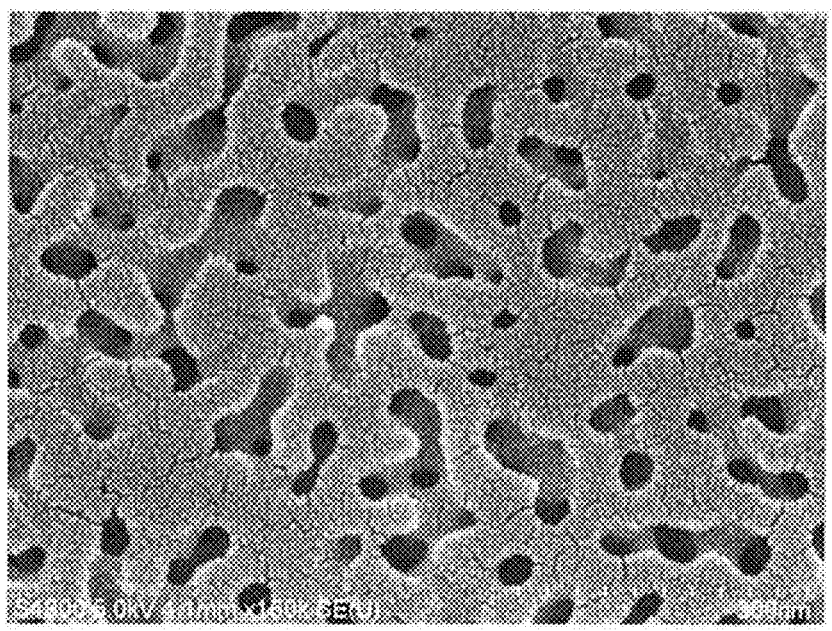
FIG. 4B is another cross sectional view of the porous glass obtained in Comparative Example 1 by observation through an electron microscope.

FIGS. 4A and 4B show the results obtained by the cross section SEM observations of the obtained glass section. FIG. 4A shows the result of an observation of an area that is 5 μm deep from the surface, and FIG. 4B shows the result of an observation of an area that is 150 μm deep from the surface. From FIGS. 4A and 4B, the formation of the porous glass structure having continuous pores like "ant nest" was realized. The average skeletal diameter of the glass surface layer section and the average skeletal diameter of the inside did not show any significant difference, and the difference was only in a range of not less than 1 nm and not more than 5 nm. The porosity did not show any change regardless if the depth from the surface changed.

Comparative Example 2

The porous glass obtained in Comparative Example 1 was subjected to a reflectance measurement. The reflectance at 700 nm was 3.51% and the reflectance at 600 nm was 3.84%, while the reflectance at 500 nm was 3.97% and the reflectance at 400 nm was 3.83%.

INDUSTRIAL APPLICABILITY

A porous glass according to the present invention is obtained by broadly controlling its porous structure to improve the optical performance so that it can find applications as optical elements in the field of optics.

LIST OF REFERENCE SYMBOLS

1: porous glass
2: glass surface layer section

3: glass inside
4: surface layer
5: matrix glass
6: phase-separated glass surface layer section
7: phase-separated glass inside While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-266326, filed Nov. 30, 2010, and No. 2011-253072, filed Nov. 18, 2011, which are hereby incorporated by reference herein in their entirety.

The invention claimed is:

1. A method of manufacturing a porous glass comprising:
a first step of forming a surface layer containing a boron compound and an alkali metal compound on a matrix glass containing a silicon oxide, a boron oxide and an alkali metal oxide;
a second step of a first heat treatment of the matrix glass and the surface layer for phase separation to form a phase-separated glass;
a third step of an acid treatment of the phase-separated glass to form the porous glass having pores; and
a fourth step of a second heat treatment of the matrix glass and the surface layer at a temperature lower than a temperature of the first heat treatment with a time of the second heat treatment from 5 hours to 120 hours between the first step and the second step.

2. The method of manufacturing a porous glass according to claim 1, wherein a temperature of the first heat treatment is from 400° C. to 800° C. and a time of the first heat treatment is from 20 hours to 100 hours in the second step.

3. The method of manufacturing a porous glass according to claim 1, wherein the temperature of the second heat treatment is from 100° C. to 500° C. in the fourth step.

4. The method of manufacturing a porous glass according to claim 1, wherein a total content of the boron oxide and the alkali metal oxide in the surface layer is from 50 wt % to 100 wt % relative to an entire surface layer in terms of oxide content.

5. The method of manufacturing a porous glass according to claim 1, wherein a thickness of the surface layer is from 10 nm to 5 μm.

6. The method of manufacturing a porous glass according to claim 1, wherein the surface layer is formed by applying a solution containing the boron compound and the alkali metal compound onto the matrix glass in the first step.

7. The method of manufacturing a porous glass according to claim 1, wherein a skeletal diameter of the porous glass increases from a surface toward an inside.

8. The method of manufacturing a porous glass according to claim 1, wherein a porosity of the porous glass decreases from a surface toward an inside.

9. The method of manufacturing a porous glass according to claim 1, wherein a thickness of the surface layer is from 30 nm to 3 μm.

* * * * *